United States Patent [19]

Ansteth

[11] Patent Number: 4,637,874
[45] Date of Patent: Jan. 20, 1987

[54] FILTER HEAD FOR SPIN-OFF FILTERS

[76] Inventor: John J. Ansteth, 2233 Star Ct., Auburn Heights, Mich. 48057

[21] Appl. No.: 764,475

[22] Filed: Aug. 12, 1985

[51] Int. Cl.$^4$ .............................................. B01D 35/00
[52] U.S. Cl. .................... 210/232; 210/541; 210/542
[58] Field of Search .............. 210/232, 322, 323.1, 210/541, 542, 239, 240, DIG. 17, 133, 323.2; 29/527.5, 527.6, 557, 558; 251/118; 55/312-314

[56] References Cited

U.S. PATENT DOCUMENTS 4,192,750 3/1980 Elfes et al. ........................... 210/232

Primary Examiner—Frank Sever
Attorney, Agent, or Firm—Gifford, Groh, VanOphem, Sheridan, Sprinkle & Dolgorukov

[57] ABSTRACT

A filter head for spin-off filters comprises an extruded body having a first longitudinal bore and a second longitudinal bore separated from each other, and an elongated, laterally expanded flat exterior surface. Fluid passageways are bored through the flat surface to intersect with the longitudinal throughbores so that separated inlets and outlets in the spin-off filter can be fluidly connected with the longitudinal bores. Preferably, the extruded body also includes a mounting flange offset from the flat longitudinal surface so that the filter head can be mounted to a surface which does not interfere with the installation or removal of the filter. The elongated extruded body is cut to any desired length required for mounting one or more filters of various sizes against the longitudinal flat surface.

14 Claims, 5 Drawing Figures

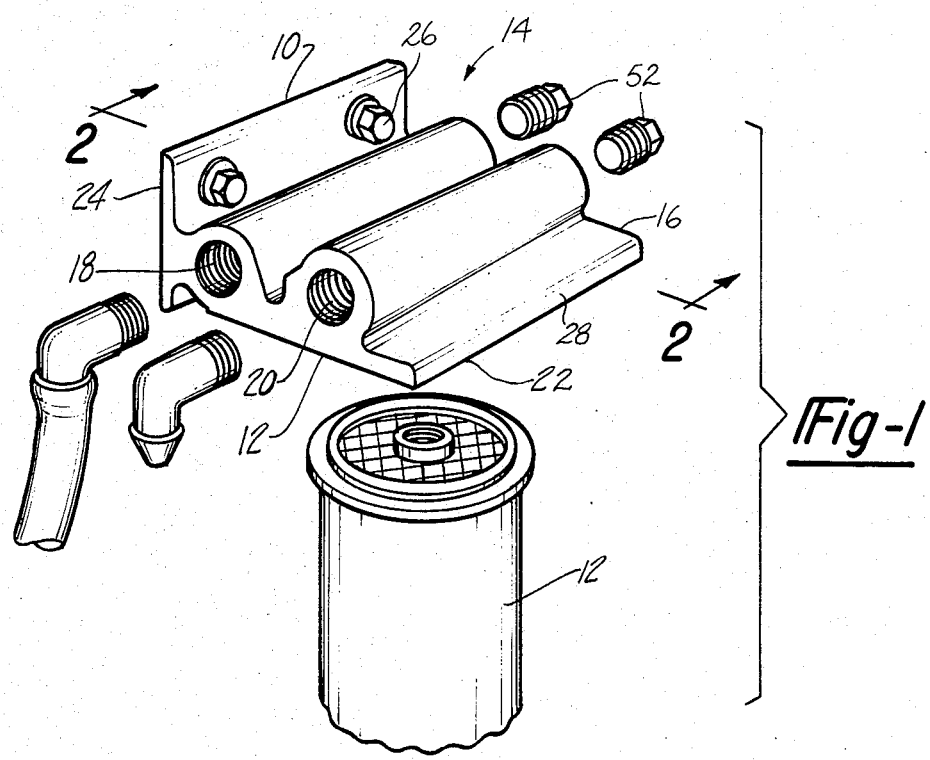
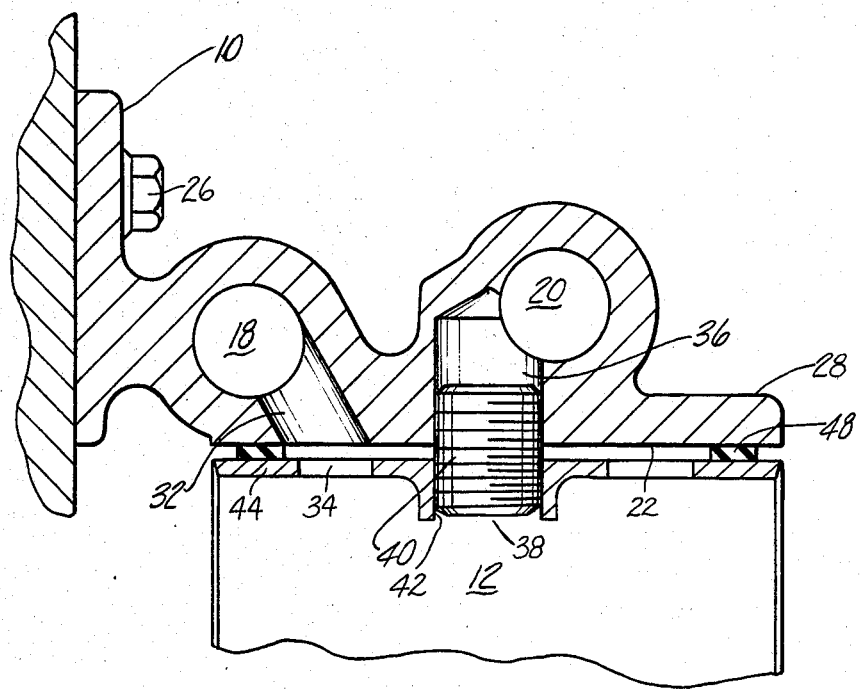

FILTER HEAD FOR SPIN-OFF FILTERS

BACKGROUND OF THE INVENTION

I. Field of the Present Invention

The present invention relates generally to fluid couplings, and more particularly to a head for mounting filters in fluid communication with the fluid conduit system.

II. Description of the Prior Art

Fluid systems often include filters which separate impurities and particulate matter from fluid flowing through the system to avoid clogging or excessive wear of parts in contact with the fluid system. Moreover, it is well known that the material removed from the fluid circulating in the system accumulates in a filter element and eventually interferes with flow of the fluid through the filter element. As a result, the filters are often removably mounted to a filter head so that they can be easily and quickly replaced when necessary.

It has previously been known to employ filter heads which are specially constructed so that a cannister holding the filter element can be threadably attached to and sealed against the head. As a result, the filter element can be replaced as necessary without disassembling the head or external cages for the filter element. Notably, since the fluid must be sealed within the filter casing during operation, means for selectively opening and sealing the container so that filter element can be removed can be quite complex and costly. Moreover, removal of the filter element alone which has been emerged in the fluid can be difficult and untidy. As a result, filter casings which are removable along with the filter element, thereby to avoid the problems of removing the filter element separately, require a head adapted to seal the filter element intermediate the inlet and outlet of the cannister.

One previously known form of removable casing is generally known as a spin-off filter. Previously known filter heads for securing spin-off filters in fluid communication with the fluid system are often specially constructed as a part of the machinery housing in which the fluid system is contained. Such incorporation can require substantial operations to be performed on the machine housing to adapt the housing to receive the easily removed spin-off filters. For example, the lubricating systems of internal combustion engines often employ a spin-off filter which mates with a filter seat specifically constructed on the engine block. Typically, the filter casing includes a threaded aperture as an outlet adapted to receive a threaded stem extending from the engine block. In addition, the filter head formed on the engine block must also include a machined surface adapted to engage a sealing ring between the end of the filter casing and the engine block. Of course, the formation of the filter head on the engine block requires substantial machining operations, which increase the cost of making the block. In addition, since the filter location cannot be altered when a filter head is formed on the engine block additional spin-off filters cannot be readily added to increase filtering capacity. In addition, it may not be possible to perform additional machining operations for forming additional filter heads on the engine block due to space restrictions or the position of adjacent equipment.

Moreover, although it has been known to form multiple filter heads so that additional filters can be included in a fluid circulation system, each such head requires individual stamping or casting, and machining and is particularly adapted to receive only a single spin-off filter. As a result, the addition of more than one additional filter to an existing fluid circulation system requires construction and installation of a filter head for each spin-off filter to be used.

SUMMARY OF THE PRESENT INVENTION

The present invention overcomes the above mentioned disadvantages by providing a filter head formed from an extruded body which can be cut to a desired length and which is therefore substantially easier to manufacture than previously known filter heads. Moreover, the extruded body can be installed at any desired location which does not interfere with positioning of spin-off filters. The extruded body includes first and second longitudinal bores which are formed as the body is extruded and a longitudinal flat surface providing a mating surface for the seal ring intermediate the spin-off filter and the head. In addition, the head preferably includes a mounting flange offset from the flat surface so as not to interfere with the location or positioning of spin-off filters.

In the preferred embodiment, the filter head includes fluid passageways extending from the flat surface which intersect with the longitudinal throughbores. One of the fluid passageways is adapted to receive a threaded tube adapted to receive a correspondingly threaded aperture in the spin-off filter. In this way, the fluid passageways are positioned to register with an inlet and outlet of the filter, respectively, when the filter is secured to the head.

In addition, the bores are separated so that fluid connectors can be threadably engaged within one axial end of each hole, whereby the holes can be coupled to a fluid system by appropriate fluid conduits. In addition, the other end of each longitudinal hole can be plugged by appropriate means such as a threaded plug.

One particular advantage of the filter head of the present invention is that a plurality of filter heads can be formed from a single extruding operation, and the elongated extruded body can be cut to any desired size as required by the number of filters to be employed in the fluid circulation system. Since the elongated body includes an elongated flat surface, spin-off filters of a variety of sizes can be employed on a single filter head without requiring reconstruction of the filter head or the use of special adapters for coupling the inlets and outlets of each spin-off filter. Moreover, it will be understood that the filter head of the present invention can be conveniently mounted separately from the engine block or machine housing and it therefore does not require machining or other operations to be performed upon the machine housing or engine block with which the fluid circulation system is employed.

BRIEF DESCRIPTION OF THE DRAWING

The present invention and its advantages will be more clearly understood by reference to the following detailed description of the preferred embodiment of the present invention when read in conjunction with the accompanying drawing in which like reference characters refer to like parts throughout the views and in which:

FIG. 1 is an exploded perspective view of a filter head and filter assembly constructed in accordance with the present invention;

FIG. 2 is a sectional view taken substantially along line 2—2 in FIG. 1;

DETAILED DESCRIPTION OF A PREFERRED EMBODIMENT OF THE PRESENT INVENTION

Figure 3:
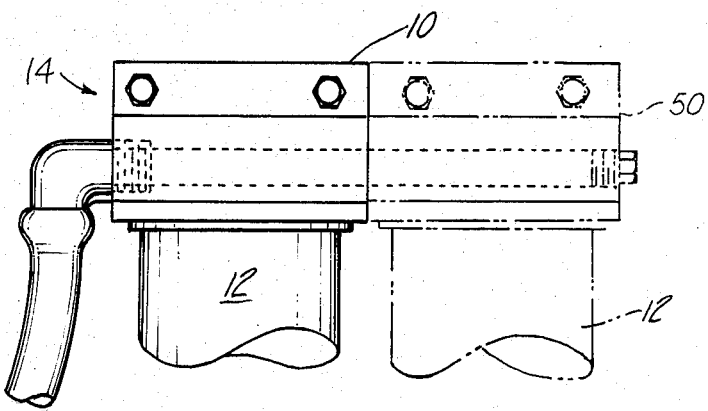
FIG. 3 is a front view of the filter head shown in FIGS. 1 and 2.

Referring first to FIG. 1, the filter head 10 of the present invention is thereshown adapted to engage a spin-off filter 12. The filter head 10 is a segment of an elongated extruded body 14 which has been cut as designated at 16. The extruded body 14 includes a first longitudinal bore 18 and a second longitudinal bore 20. The longitudinal bores 18 and 20 are separated from each other, and the throughbore 20 extends along the body 14 substantially at the center of a laterally extended, longitudinal flat surface 22 which is formed in part by the laterally extended flange 28. In addition, an upwardly extending attachment flange 24 includes a plurality of mounting devices 26 aligned so that the head 10 can be attached to a surface offset from the removable filters 12. The upper surface is configured to reduce the weight of the filter head 10 while providing rigid support for the mounting flange 24, the flat surface 22 and the perpheral support walls of the bores 18 and 20.

As best shown in FIG. 2 a fluid passageway 32 extends from the flat surface 22 toward the longitudinal bore 18 and intersects with the bore 18 to provide fluid communication with the inlet 34 of the spin-off filter 12. In addition, a fluid passageway 36 extends from the flat surface 22 toward the longitudinal bore 20 and intersects with the bore 20 to provide fluid communication with the outlet 38 of the spin-off filter 12. Preferably, the filter 12 is connected to filter head 10 by means of the threaded tube 40 secured in the fluid passageway 36 by appropriate means such as cement, locking keys or the like. The threaded tube 40 extends outwardly to threadably engage the threaded aperture 42 at the center of the end wall 44 of the filter 12. The radially outer ends of the end wall 44 also support a sealing ring 48 which is therefore positioned to abuttingly engage the flat surface 22 of the filter head 10.

As best shown in FIG. 3, the filter head 10 can be easily adapted to receive more than a single filter 12 by merely elongating the portion of the segment cut from the elongated body 14. Thus, as shown in phantom line at 50 in FIGS. 1 and 3, the position at which the elongated body 14 is cut determines the length of filter head 10 and thus the size or number of filter elements which can be attached to the filter head 10.

Figure 4:
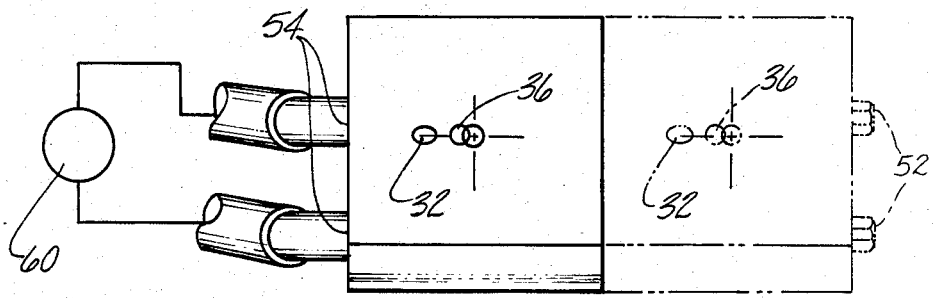
FIG. 4 is a bottom view of a filter head shown in FIGS. 1-3.

In any event, as best shown in FIG. 4, one end of each longitudinal bore 18 and 20 is enclosed by an end plug 52 which is threadably engaged within an end of each housing portion defining the bores 18 and 20. The other end of each longitudinal bore 18 and 20 is adapted to receive a fluid coupling such as the elbow 54 so that the filter head 10 can be fluidly coupled in direct fluid communication with the fluid circulation system 60.

Figure 5:
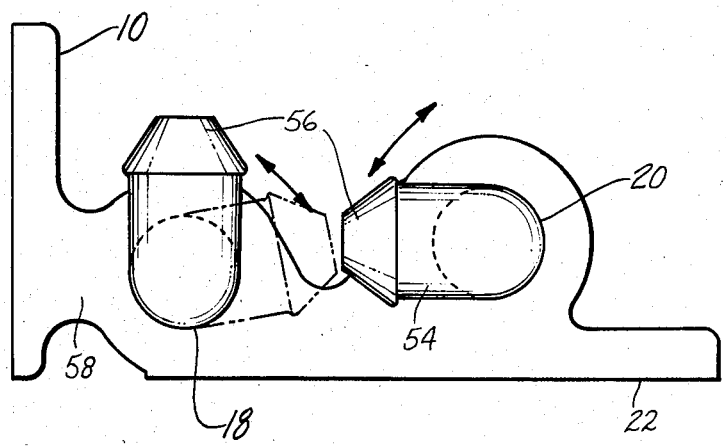
FIG. 5 is a side elevational view of the filter head shown in FIGS. 1-4.

As shown in FIG. 5, the spacing between the bores 18 and 20 is long enough to permit the radially extending ends 56 of each elbow 54 to be rotated without interference with each other. Even if the couplings are not elbow shaped, the spacing permits a tool to be engaged with the coupling for insertion or removal without obstruction from the adjacent coupling. Moreover, the extruded body includes a web 58 between the mounting flange 24 and the peripheral wall of bore 18 so that rotation of the elbow 54 or other coupling is not obstructed by the flange 24 or the surface to which it is mounted. In addition, the web 58 provides spacing for tool engagement with the mounting bolts 26 (FIG. 1).

Having thus described the important structural features of the present invention, the operational and functional advantages of the filter head 10 according to the present invention can be readily described. It will be understood that the body 14 can be formed to any desirable length, for example, 6 feet, which can be easily extruded. Such a length permits a plurality of filter heads 10 to be cut therefrom, and also reduces substantially the storage space required for the plurality of filter heads before use or installation. Nevertheless, once the desired number of filters to be connected is determined, the elongated extruded body 14 is then cut to produce a number of filter heads 10. The fluid passageways 32 and 36 are bored through the flat surface 22 of each head 10 so that the ends of the fluid passageways at the surface 22 register and communicate with the inlet 34 and the outlet 38, respectively. Thus, it will be understood that the positions and alignment of these passageways can vary throughout a wide range so long as the passageways intersect their respective longitudinal bores 18 or 20.

A threaded tube 40 is then secured within the passageway 36 so that the spin-off filter 12 can be easily threaded onto and spun off from the tube 40. When the filter 12 is installed, the passages 32 and 36 are sealed in fluid communication with the inlet 34 and outlet 38 respectively, on opposite sides of the filter element (not shown). In addition, plugs 52 are then inserted in one end of each longitudinal bore 18 and 20. Moreover, the fluid couplings 54 are secured within the opposite ends of the longitudinal bores 18 and 20 so that the bores, and thus, the filter can be fluidly connected to fluid circuit 60. Thus, fluid from the system 60 is forced to pass through the longitudinal bore 18 and to the inlet of the filter 34, through the filter element 13 and outwardly through the fluid outlet 38 into the longitudinal bore 20 and back into the system 60.

It can be appreciated that mounting flange 24, which is offset from, and in the preferred embodiment, perpendicular to the flat surface 22 permits the filter head 10 to be secured on a convenient surface without interfering with the removal or installation of the filter 12. For example, it will be understood that filter head 10 of the present invention can be mounted on internal body panels of a motor vehicle rather than on an engine block as has been previously done so that filter changes can be more easily accomplished than with the previously known filter heads incorporated in the engine block of motor vehicles. Moreover, the present invention permits additional filters to be easily added to existing fluid circulation systems.

In addition, it can be appreciated that the filter head is substantially easier to make than the previously known filter heads, especially those required to be made on the machine housing itself in which the circulation system is employed. Furthermore, a plurality of filter heads can be formed during a single extrusion operation, and the elongated body can be cut as desired to form a plurality of filter heads.

Having thus described the present invention, many modifications thereto will become apparent to those skilled in the art to which it pertains without departing from the scope and spirit of the present invention as defined in the appended claims.

What is claimed is:

1. A filter head comprising: at least one spin-off filter having a diameter and having a fluid inlet structurally separated from a fluid outlet, said filter head comprising including,:

an extruded body having a first body portion defining a first longitudinal bore, a second body portion defining a second longitudinal bore separated from said first longitudinal bore, and a flat longitudinal surface; and means for mounting at least one spin-off filter against said flat surface so that said fluid inlet is in fluid communication with said first longitudinal bore and said fluid outlet is in communication with said second longitudinal bore;

wherein the length of said body is about equal to an integral multiple of the diameter of said filter, said multiple corresponding to the number of said at least one filter.

2. The invention as defined in claim 1 and further comprising means for plugging an end of said first longitudinal hole and means for plugging an end of said second longitudinal hole.

3. The invention as defind in claim 2 and further comprising means for fluidly coupling a second end of said first longitudinal hole to a fluid conduit system, and means for fluidly coupling a second end of said second longitudinal hole to a fluid conduit system.

4. The invention as defined in claim 3 wherein said mounting means comprises a first fluid passage extending from said flat surface toward and intersecting with said first bore and a second fluid passage extending from said flat surface toward and intersecting with said second bore.

5. The invention as defined in claim 4 wherein said fluid outlet comprises a threaded aperture in an end wall of said filter and wherein said second fluid passage includes a correspondingly threaded tubular stem, and means for mounting said stem to extend outwardly from said flat surface.

6. The invention as defined in claim 1 wherein said body includes a mounting flange offset from said flat, longitudinal surface.

7. The invention as defined in claim 6 wherein said body includes a web intermediate said mounting flange and a peripheral wall defining said first hole.

8. A method comprising forming a filter head for at least one spin-off filter having a diameter and having a fluid inlet structurally separated from a fluid outlet at an end of said filter, by the steps of, extruding a material to form an elongated body having first and second longitudinal bores spaced from each other, and a flat exterior surface; and cross sectionally cutting said elongated body to form a segment having a length at least as long as any integral multiple of the diameter of said filter.

9. The method as defined in claim 8 and further comprising forming at least one first passageway and at least one second passageway through said flat surface to intersect with said first bore and said second bore, respectively, to register with said bores for fluidly connecting said first and second bores to said inlet and said outlet, respectively.

10. The method as defined in claim 9 and further comprising the steps of plugging an axial end of each of said first and second longitudinal bores.

11. The method as defined in claim 9 and further comprising the step of threading at least one end of each of said first and second bores.

12. A process comprising: forming a filter head for at least one spin-off filter having a diameter and having a fluid inlet structurally separated from a fluid outlet at an end of said filter, by the steps of extruding a material to form an elongated body having first and second longitudinal bores spaced apart from each other, and a flat exterior surface; and cross sectionally cutting said elongated body to form a segment having a length at least as long as any integral multiple of the diameter of said at least one filter.

13. The invention as defined in claim 12 wherein said segment is cut to about a length which is an integral multiple of the diameter of said at least one filter, said multiple corresponding to the number of said at least one filter.

14. A filter head assembly comprising: an integral number of spin-off filters each having a fluid inlet structurally separated from a fluid outlet, said filter head assembly including.

an extruded body having a first body portion defining a first longitudinal bore, a second body portion defining a second longitudinal bore separated from said first longitudinal bore, and a flat longitudinal surface;

means for mounting said integral number of spin-off filters against said flat surface so that said fluid inlets are in fluid communication with said first longitudinal bore and said fluid outlets are in fluid communication with said second longitudinal bore; and means for enabling said extruded body to be cross-sectionally cut to provide a corresponding integral number of loci for said mounting means.

* * * * *